3,522,007
PURIFICATION OF CHLORINE

Ludo K. Frevel, Midland, and Leonard J. Kressley, Saginaw, Mich., assignors to The Dow Chemical Company, Midland, Mich., a corporation of Delaware
No Drawing. Original application Mar. 14, 1966, Ser. No. 533,842. Divided and this application Nov. 18, 1968, Ser. No. 794,455
Int. Cl. C01b 7/02; B01d 53/14
U.S. Cl. 23—219             6 Claims

ABSTRACT OF THE DISCLOSURE

Chlorinated carbon containing 10–15% by weight of chemically bound chlorine is useful for removing impurities from chlorine by contacting the latter at a temperature of 0–50° C. under 1 to about 10 atmospheres pressure.

---

This is a division of application Ser. No. 533,842 filed Mar. 14, 1966, now abandoned.

This invention relates to a method of purifying chlorine by passing the latter through the chlorinated carbon particles, containing from about 10 to about 15% by weight of chemically bound chlorine and substantially no chemically bound hydrogen, at 1 to 10 atmospheres pressure and at a temperature of 0–50° C. More particularly, the invention pertains to a method for purifying chlorine by passing chlorine, containing small amounts of chlorinated hydrocarbons, phosgene, traces of water, $Br_2$ and other contaminants, through the chlorinated carbon until a certain predetermined level of contaminants remains unadsorbed by the chlorinated carbon, and desirably desorbing the impurities from the chlorinated carbon and repeating the cycle.

Chlorine made by electrolysis of metal chloride almost invariably contains small amounts of contaminants including organic halides, such as chloroform, carbon tetrachloride, or halides of higher hydrocarbons, small amounts of phosgene, other halogens, such as bromine, and oxyhalides, such as phosgene. For many purposes, it is essential to reduce the amount of contaminants to a range of .1–20 p.p.m. Thus users often purchase chlorine with relatively rigid standards of high purity. Also, the type and amount of impurity may have a very profound effect on the degree of corrosion of storage and reactor materials. Therefore, a highly purified chlorine is a product that is desired in the industry.

The chlorinated carbon of this invention is unusually stable in that it can be used for adsorbing impurities from chlorine and thereafter repeatedly treated to desorb the contaminants, under a wide variety of conditions and elevated temperatures without losing its absorbing power after regeneration.

The chlorine coming into contact with the chlorinated carbon should preferably contain no more than about 10 p.p.m. water, and more preferably less than about 5 p.p.m water. The drying of the chlorine can be effected in a separate dehydrating unit or it can be effected just prior to making contact with the chlorinated carbon by passage through a bed of aluminum oxide which catalyzes the reaction between the water and phosgene to form $CO_2$ and HCl. Alternatively, the amount of water vapor and phosgene can be adjusted to substantially equimolar quantities prior to the catalytic drying treatment.

EXAMPLE 1

In a glass tube 10 cm. long, having a 25 ml. internal volume were placed 8.728 g. of coconut charcoal sold as U–11. The tube was heated to 300° C. in a nitrogen atmosphere. Chlorine was admitted to the tube at a rate of about 100 ml. per min. for 2 hours. Cooling of the carbon was effected in a dry nitrogen atmosphere. When analyzed by X-ray fluorescense, the carbon was found to contain 13% by weight of chlorine. No chemically bound hydrogen could be detected on the charcoal.

It is not necessary to flush the charcoal with nitrogen prior to chlorination. Equally good results are obtained when chlorine is passed slowly through the tube during the heating step, if the temperature is raised fairly rapidly and is controlled, so that no excessively high temperatures (>500° C.) are reached.

EXAMPLE 2

Dry chlorine containing about 5 p.p.m. water and 482 p.p.m. $CCl_4$ at 23° C. at a rate approximately 64 g./hour was vaporized and passed through a bed of 8.729 g. charcoal which had ben previously chlorinated at 300° C. The chlorinated charcoal had 13% by weight of chemically combined chlorine. The effluent from the purifier was passed through an infra-red spectrometer having a 1.3 meter path length. For more than 4 hours no $CCl_4$ could be detected. At the end of 5 hours, the effluent from the purifier contained an estimated 20 p.p.m. $CCl_4$. The flow of contaminated chlorine was stopped and the charcoal containing tube was weighed and found to have gained 5.15 g. after passage of 322 g. of the contaminated chlorine.

The chlorinated charcoal bed was reactivated by passing helium at about one atmosphere at a rate of about 100 ml./minute through the bed and gradually heating to 225° C. This consumed about 6 hours. The effluent was passed through a liquid nitrogen trap and 4.92 g. of desorbed mixture were collected. Analysis of the condensate showed that it contained 153 mg. of $CCl_4$ and 43 mg. of HCl.

The helium was used to desorb the material on the chlorinated charcoal to simplify the condensing and analysis of the desorbed ingredients contained in the effluent.

EXAMPLE 3

A glass tubular reactor with an I.D. of about 1.5 cm. and a 25 ml. internal volume was loaded with 4.3 g. alumina and 8.7 g. charcoal. The unit was heated to 300° C. while flowing nitrogen therethrough. On attaining the desired temperature, chlorine was fed into the reactor for 3 hours. The temperature was held at 300° C. during the chlorine flow. Thereafter, cooling to room temperature was effected with a flow of nitrogen through the chlorinated bed. Weighing of the cooled unit showed that the increase in weight amounted to 12.1%, which is attributed to substitution of hydrogen on the carbon by chlorine.

Liquid chlorine was vaporized, passed through a rotameter and fed into the adsorbing bed at a rate of approximately 90 g./hour and a temperature of 0–50° C. The effluent was passed directly through a 1.3 meter glass cell of an infra-red spectrometer and analyzed continuously. The flow of chlorine was continued until the concentration of impurities in the effluent reached about 50% of those present in the chlorine feed, at which time the feed was stopped, the absorption unit was weighed and purified chlorine was fed counter to the original flow at 200–300° C. at about 19 g./hour to desorb the impurities. When the impurities in the effluent from the reactivation stream dropped to 10–20 p.p.m., the purification cycle was resumed. Impurities detected and analyzed in the spectrometer were $COCl_2$, $CHCl_3$ and $CCl_4$. Solid $C_2Cl_6$ was also detected as crystalline material in the effluent line during the charcoal desorbing step. The chlorine also contained 20–50 p.p.m. water.

During the first 9 cycles, reactivation was effected at 200, 250 and 300° C. at atmospheric pressure.

The duration of the purification steps varied from 5.9 to 23 hours, while the stripping steps ranged from 2.5 to 8.5 hours, depending in part on the rate of back flow of purified chlorine and on the temperature. Usually, contaminants are stripped from the carbon more rapidly at higher temperatures and also with faster flow rates at any given temperature.

For the next 22 cycles, purification was effected by passing chlorine in vapor phase through the chlorinated carbon bed at 0–50° C. for periods of 5.5 to 8 hours. The reactivation of the chlorinated carbon, however, was effected at pressures of 10 to 150 mm. Hg. and a 200° C. temperature. Under these conditions, the back flow of purified chlorine for stripping contaminants was reduced to about 4 g./hour. In the fourth cycle of this procedure, at the end of the first hour in the purification step, only traces of $CCl_4$ and phosgene and about 12 p.p.m. of $CHCl_3$ were found. The phosgene increase in the effluent was very gradual and reached a maximum of about 10 p.p.m. after 5 hours. The $CCl_4$ content was quite low, about 3 p.p.m. at four hours, and increased to 20 p.p.m. at 5 hours. $CHCl_3$ was negligible for the first half hour, rose to about 12 p.p.m. at 1 hour and gradually increased to 20 p.p.m. at 5 hours.

Three cycles were run using nitrogen at approximately atmospheric pressure and 200° C. for stripping contaminants from the carbon. The chlorine purification step was carried out as described above for periods of 4 to 6 hours. The reactivation of the chlorinated carbon was effected in 6.6 to 16 hours.

It is apparent that after adsorption of the impurities on the chlorinated carbon, a wide variety of gaseous ingredients which will not react with the carbon can be used for stripping the adsorbed impurities.

EXAMPLE 4

A series of eight runs were made by adding approximately 1% air to the impure chlorine just ahead of the adsorbing bed. This had the effect of increasing phosgene, but lowering both the $CCl_4$ and $CHCl_3$ content of the effluent stream. After 2 hours the $CCl_4$ content in the effluent was still negligible, the $CHCl_3$ content was about 9 p.p.m. and phosgene was about 60 p.p.m. The chlorinated charcoal was reactivated during each of these cycles by the vacuum stripping procedure described in Example 3.

EXAMPLE 5

A series of 14 cycles was run to dry the chlorine feed and convert $COCl_2$ to HCl and $CO_2$ prior to making contact of the chlorine with the chlorinated charcoal by first passing the contaminated chlorine through an alumina bed at a temperature of 100–140° C. to cause the reaction $COCl_2 + H_2O \rightarrow CO_2 + 2HCl$ to proceed. Then the dry chlorine, containing no more than 10 p.p.m. water, was passed through the chlorinated carbon bed to remove any remaining contaminants.

It is apparent that substantially all the $CHCl_3$ and $CCl_4$ can first be converted to $COCl_2$ and sufficient $H_2O$ added to the stream prior to passing it through the alumina to catalyze the breakdown of $COCl_2$ to $CO_2$ and HCl before passing the chlorine through the chlorinated carbon adsorbing unit. In this manner, a chlorine free of chlorinated hydrocarbons can be obtained.

In each case where the chlorine was first passed through a bed of alumina to dry the feed and convert $COCl_2$ to $CO_2$ and HCl, the effluent from the purification step contained only traces of $CCl_4$ and phosgene, and about 10–12 p.p.m. $CHCl_3$. Regeneration or reactivation of the chlorinated carbon was effected by vacuum stripping, but any other reactivation step described above can also be employed.

The purification steps were carried out for periods of 4.75 to 8 hours and strippnig steps ran from 6.1 to 7.5 hours.

An important feature of the procedure which utilizes the pre-drying step is that the purification equipment can be manufactured of nickel. Test pieces of nickel in the path of the chlorine stream in the purification section showed negligible signs of corrosion, as contrasted with very evident corrosion sites in test pieces where the chlorine feed contained 20–50 p.p.m. water.

For comparative purposes, carbon treated with chlorine at —33 to 65° C. was employed as an adsorbing agent for chlorine impurities. It was found that while contaminants would be removed for a limited period, the stripping of those impurities could not be accomplished safely in a reasonable time below 100° C. At higher temperatures of stripping a run-away chlorination proceeds which deactivates the charcoal and forms $NiCl_2$ in a nickel reactor.

Although the individual steps in the examples are described for a batch process, the procedure is readily adaptable to a continuous operation, wherein the chlorinated carbon is part of a moving bed, with means for withdrawing some of the chlorinated carbon continuously or intermittently, conveying the so-removed adsorbent to a stripping zone and returning the stripped chlorinated carbon back to the purification or adsorption zone.

Tests were conducted for almost a year using a cyclically regenerated bed of chlorinated charcoal for removing chlorinated hydrocarbon impurities from chlorine.

In these tests the reactor was made of 3 inch inner diameter nickel pipe 72 inches long, fitted with a steam jacket. It had a flanged opening at the top, a thermocouple well 24 inches from the bottom and vent nozzles of 1 inch nickel pipe at the top and bottom. The bottom nozzle was fitted with nickel turnings retained between nickel screens, and the upper nozzle was protected by a screen enclosure. The bottom of this reactor was packed with ¼″ Mullite marbles followed by ¼″ Berl saddles to a depth of about one inch above the screen.

A charge of 7.75 lbs. of pre-chlorinated U–9 charcoal containing about 12–14% chemically bonded chlorine was placed in the reactor over the Berl saddles.

Chlorine which was first passed through a catalytic alumina dryer described above to convert phosgene and water to $CO_2$ and HCl, was then fed through a water jacketed pipe and then into the bottom of the reactor. The feed rate of $Cl_2$ ranged from 12 to 15 lbs. per hour. The unit was operated on an absorbing or purifying cycle of 24 hours and a stripping or reactivating cycle of this same length.

Reactivation was effected by passing purified chlorine through the top of the reactor at a rate of about ¼ lb. per hour while the unit was heated to attain a temperature of about 225° C. The chlorine was withdrawn from the bottom of the reactor. The purified chlorine feed was maintained for about 16 hours, after which the chlorine feed was stopped and the charcoal was permitted to cool for about 8 hours. Thereafter the purification cycle was repeated.

At the end of approximately a year of alternate chlorine purification and charcoal regeneration cycles, the purified chlorine effluent contained less than 10 p.p.m. $CCl_4$ after a 24 hour purification cycle. The $CCl_4$ content of the impure chlorine ranged from about 100 to as high as 600 p.p.m. At most only minute traces of chlorinated hydrocarbons, such as $C_2Cl_6$, could be detected in the effluent by infra-red spectrometry.

At the end of the testing period the nickel turnings, nickel screens and the reactor showed no appreciable signs of corrosion.

We claim:

1. A method of purifying chlorine contaminated with small amounts of impurities comprising contacting said chlorine at 0–50° C. and from 1 to about 10 atmospheres pressure with a carbon containing substantially no chemically bound hydrogen and from about 10 to about 15% of chemically bound chlorine, desorbing the contaminants from the said carbon at a temperature of at least 200° C. in a non-oxidizing atmosphere, and repeating the chlorine purification cycle.

2. The method of claim 1 in which the carbon is an activated charcoal containing 12–14% by weight of chemically bound chlorine.

3. The method of claim 1 in which adsorbed impurities on the chlorinated carbon are stripped therefrom by heating to a temperature of 200–300° C. in a non-oxidizing atmosphere and the so stripped chlorinated carbon is again contacted with impure chlorine.

4. The method of claim 1 in which the chlorine fed into the purifier is dried to a water content no greater than about 10 p.p.m.

5. The method of claim 4 in which drying of the chlorine is effected by adjusting the water and phosgene impurities to substantially equimolar proportions and passing the mixture through a bed of alumina at 100–140° C.

6. The method of claim 3 in which reactivation of the chlorinated carbon is effected under reduced atmospheric pressure with a back-flow of purified chlorine.

References Cited

UNITED STATES PATENTS

| | | | |
|---|---|---|---|
| 2,786,816 | 3/1957 | Guevin | 23—219 |
| 2,910,140 | 10/1959 | Bencker et al. | 23—219 |
| 3,066,099 | 11/1962 | Mohun | 252—445 |

OTHER REFERENCES

Stratton, G. W., et al.: "Industrial and Engineering Chemistry," vol. 34, No. 5, May 1942, pp. 603–605.

OSCAR R. VERTIZ, Primary Examiner

G. O. PETERS, Assistant Examiner

U.S. Cl. X.R.

55—29